(12) United States Patent
Yamane

(10) Patent No.: US 11,388,316 B2
(45) Date of Patent: Jul. 12, 2022

(54) IMAGE CAPTURE APPARATUS

(71) Applicant: ISUZU MOTORS LIMITED, Tokyo (JP)

(72) Inventor: Naoya Yamane, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 17/253,902

(22) PCT Filed: Jun. 17, 2019

(86) PCT No.: PCT/JP2019/023840
§ 371 (c)(1),
(2) Date: Dec. 18, 2020

(87) PCT Pub. No.: WO2019/244823
PCT Pub. Date: Dec. 26, 2019

(65) Prior Publication Data
US 2021/0274066 A1 Sep. 2, 2021

(30) Foreign Application Priority Data
Jun. 19, 2018 (JP) .............................. JP2018-116164

(51) Int. Cl.
*G03B 30/00* (2021.01)
*B60R 11/04* (2006.01)
(Continued)

(52) U.S. Cl.
CPC ............ *H04N 5/2251* (2013.01); *B60R 11/04* (2013.01); *G03B 11/045* (2013.01); *G03B 30/00* (2021.01); *B60R 2011/0026* (2013.01)

(58) Field of Classification Search
CPC ............. B60R 11/04; B60R 2011/0026; B60R 2011/004; G03B 11/045; G03B 30/00; H04N 5/2251
(Continued)

(56) References Cited

U.S. PATENT DOCUMENTS

2015/0015713 A1* 1/2015 Wang ..................... H04N 5/235
348/148
2016/0229346 A1 8/2016 Oh
(Continued)

FOREIGN PATENT DOCUMENTS

JP 2009006856 A 1/2009
JP 2010069989 A * 4/2010
(Continued)

OTHER PUBLICATIONS

International Search Report and Written Opinion for related PCT App No. PCT/JP2019/023840 dated Jul. 30, 2019, 6 pgs. (partial translation).
(Continued)

*Primary Examiner* — Christopher S Kelley
*Assistant Examiner* — Kathleen M Walsh
(74) *Attorney, Agent, or Firm* — Procopio, Cory, Hargreaves & Savitch LLP

(57) ABSTRACT

An image capture apparatus includes: an image capture unit provided at the front of a vehicle and capturing images in front of the vehicle; a cover accommodating the image capture unit and having an opening located in front of a lens of the image capture unit; and a shield portion extending from an edge of the opening toward the inside of the cover and shielding at least part of a region between the edge of the opening and the image capture unit. The shield portion includes: a side rib extending rearward in a front-rear direction of the vehicle from a side edge of the opening in an inner surface of the cover; and a lower rib extending rearward in the front-rear direction of the vehicle from a lower edge of the opening in the inner surface of the cover.

6 Claims, 6 Drawing Sheets

(51) Int. Cl.
*G03B 11/04* (2021.01)
*H04N 5/225* (2006.01)
*B60R 11/00* (2006.01)

(58) Field of Classification Search
USPC .......................................................... 348/148
See application file for complete search history.

(56) References Cited

U.S. PATENT DOCUMENTS

| | | | |
|---|---|---|---|
| 2016/0332510 A1* | 11/2016 | Kinnou | ................... B60J 5/101 |
| 2016/0332584 A1* | 11/2016 | Yasuhara | ................ B60R 13/02 |
| 2016/0373620 A1* | 12/2016 | Sato | ..................... H04N 5/2254 |
| 2017/0217382 A1* | 8/2017 | Gunes | ...................... B60R 1/00 |
| 2018/0105101 A1* | 4/2018 | Tatara | ...................... B08B 5/02 |
| 2018/0319350 A1* | 11/2018 | Ji | ......................... B60R 19/483 |

FOREIGN PATENT DOCUMENTS

| | | | |
|---|---|---|---|
| JP | 2010069989 A | | 4/2010 |
| JP | 2011160365 A | * | 8/2011 |
| JP | 2014216730 A | | 11/2014 |
| JP | 2017081261 A | * | 5/2017 |
| JP | 2017081261 A | | 5/2017 |

OTHER PUBLICATIONS

German Patent and Trademark Office, Office Action, Application No. DE 11 2019 003 106.6, dated Apr. 12, 2022, in 4 pages.

* cited by examiner

[FIG. 1]
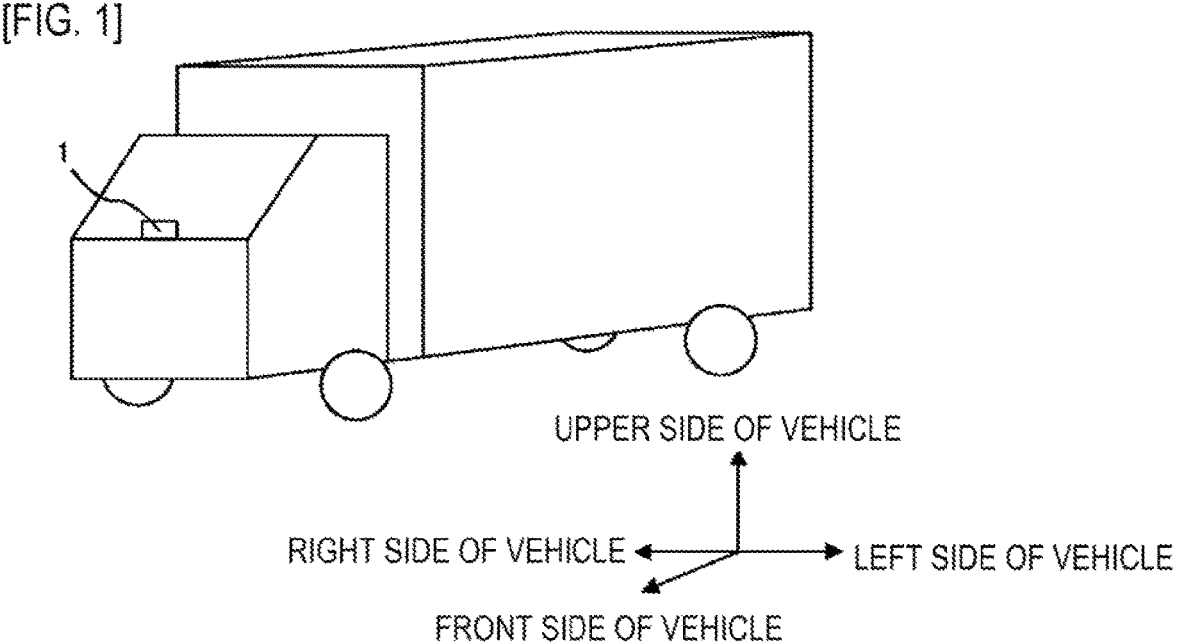
[FIG. 2]
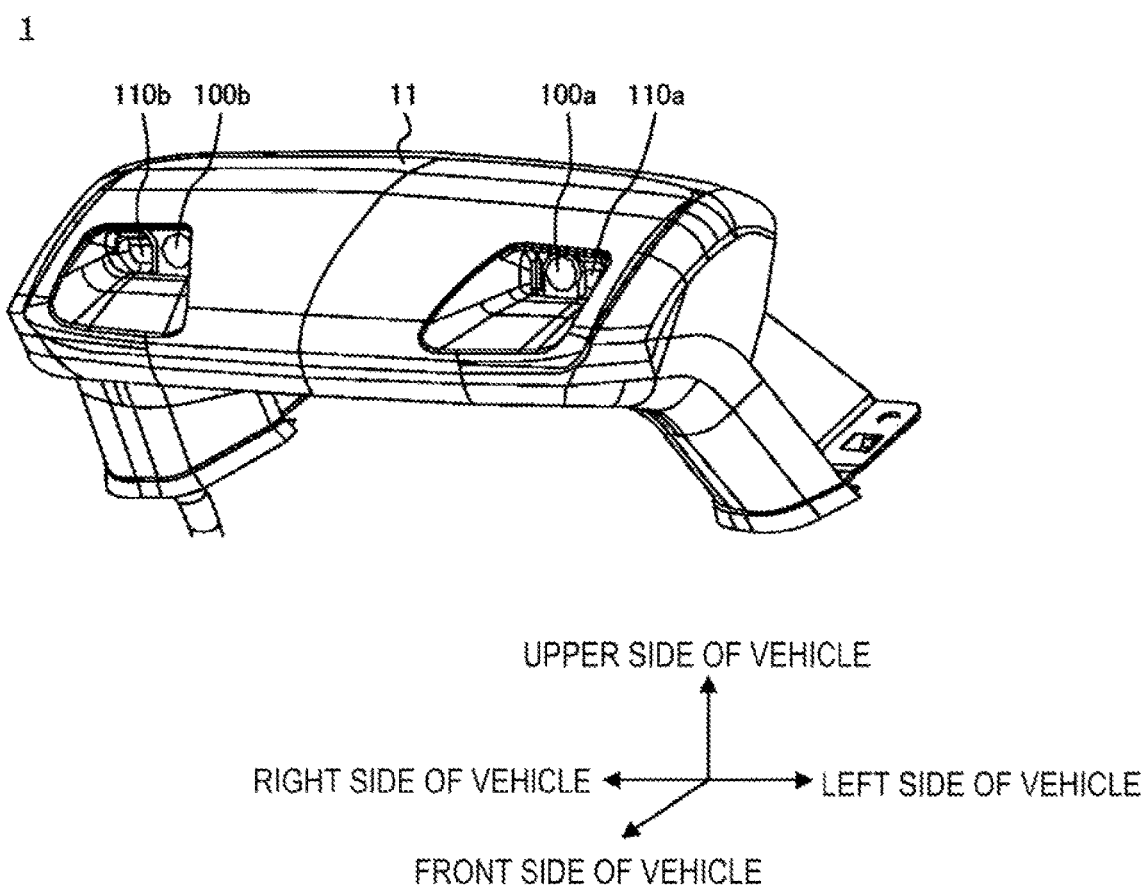

[FIG. 3]
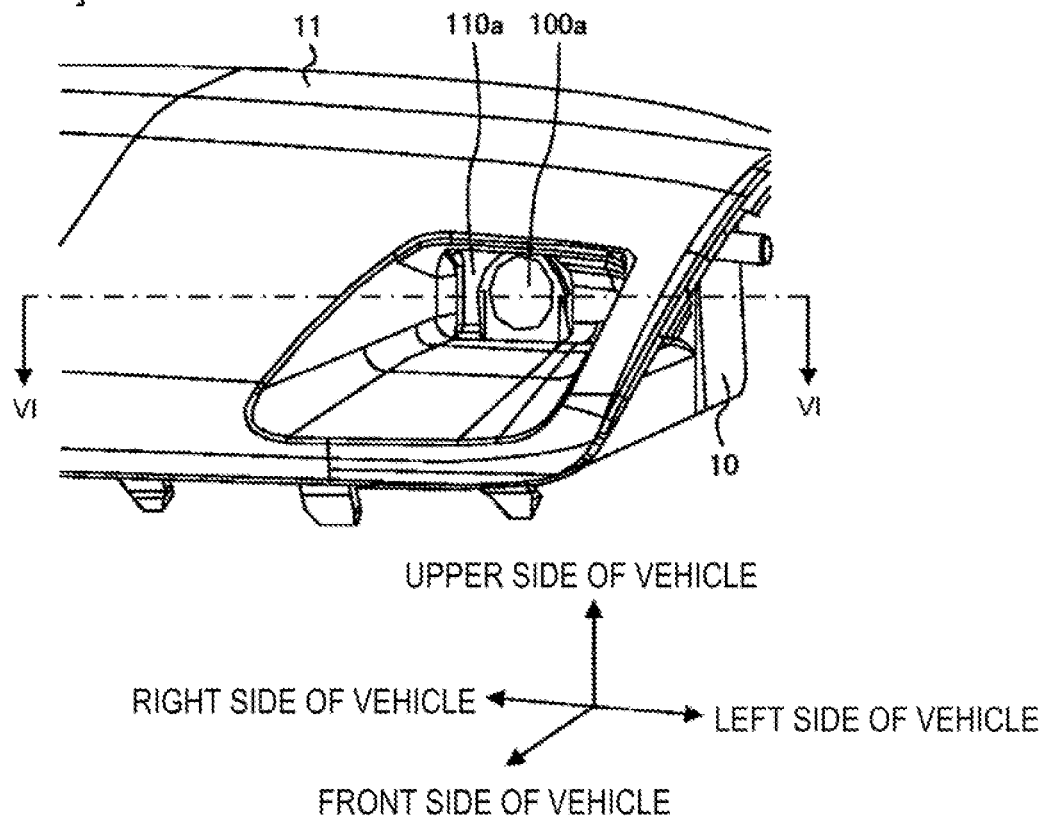
[FIG. 4]
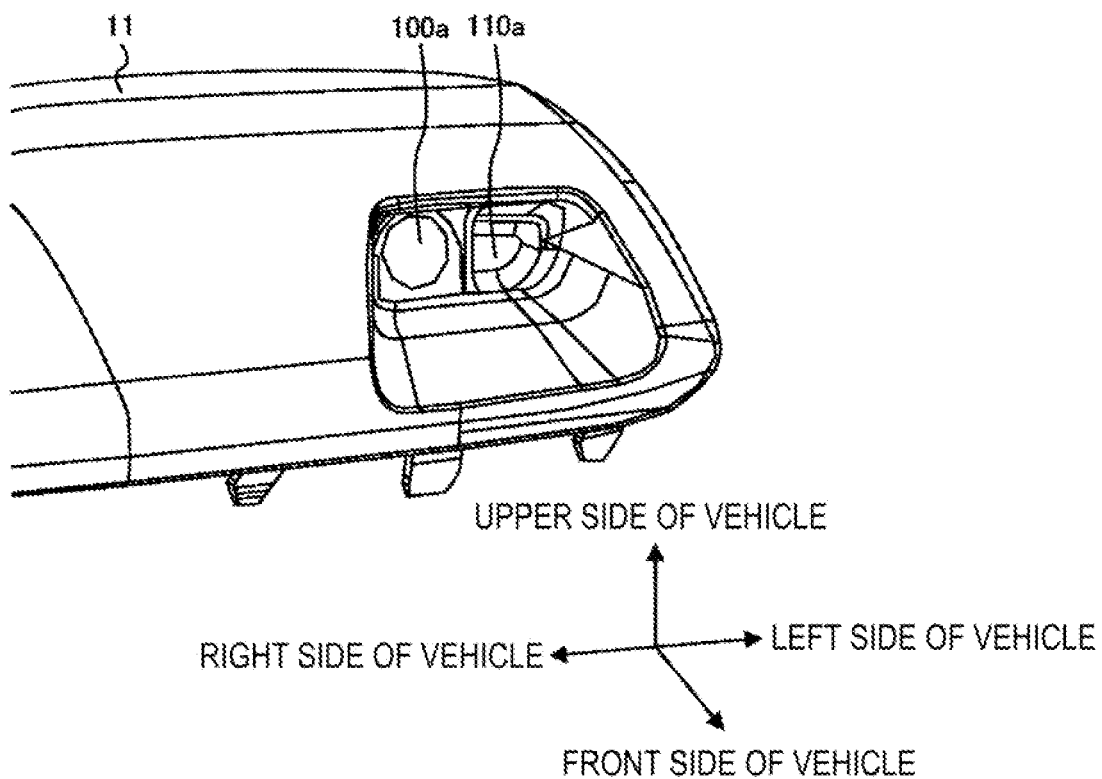

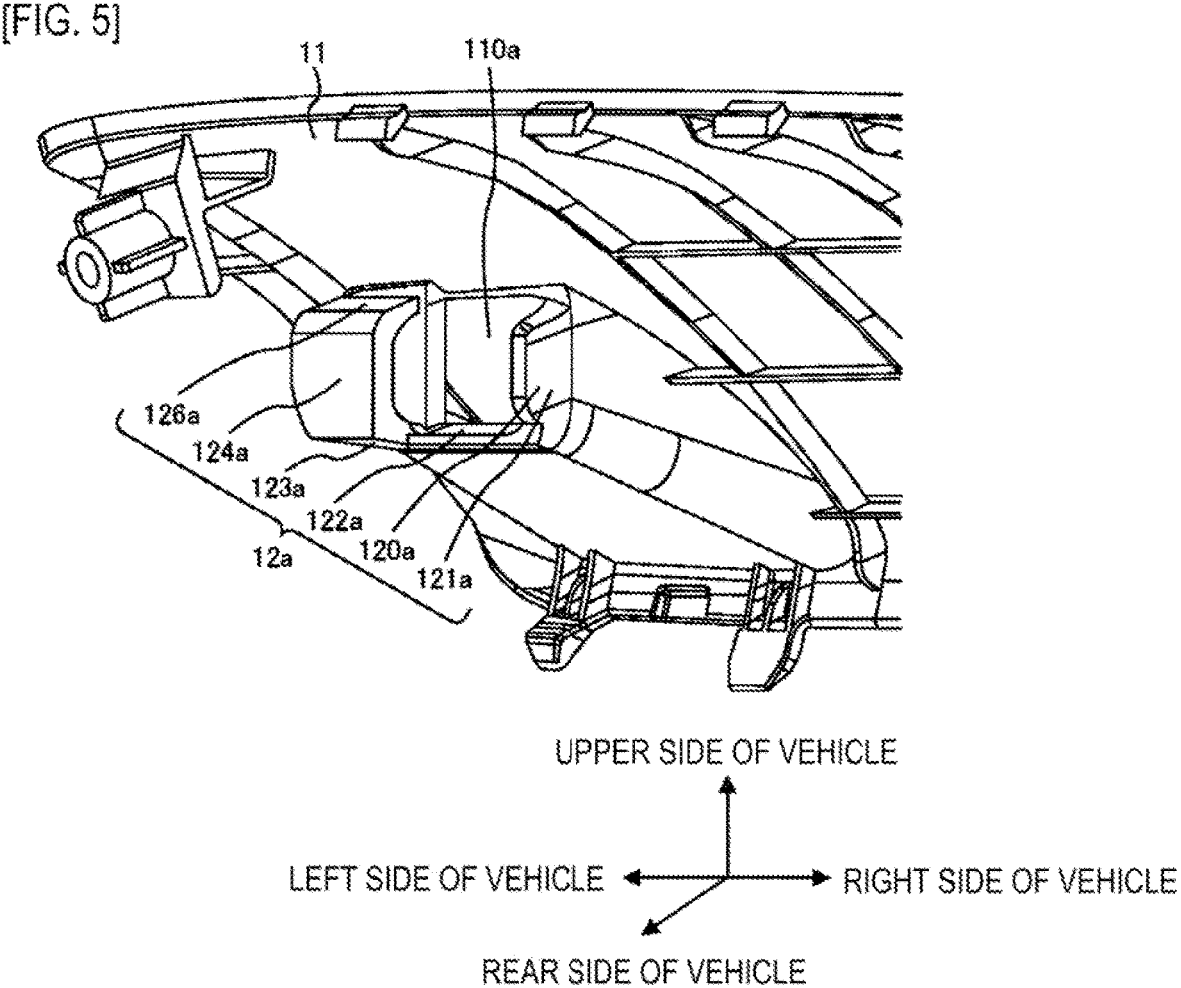
[FIG. 5]

[FIG. 6]
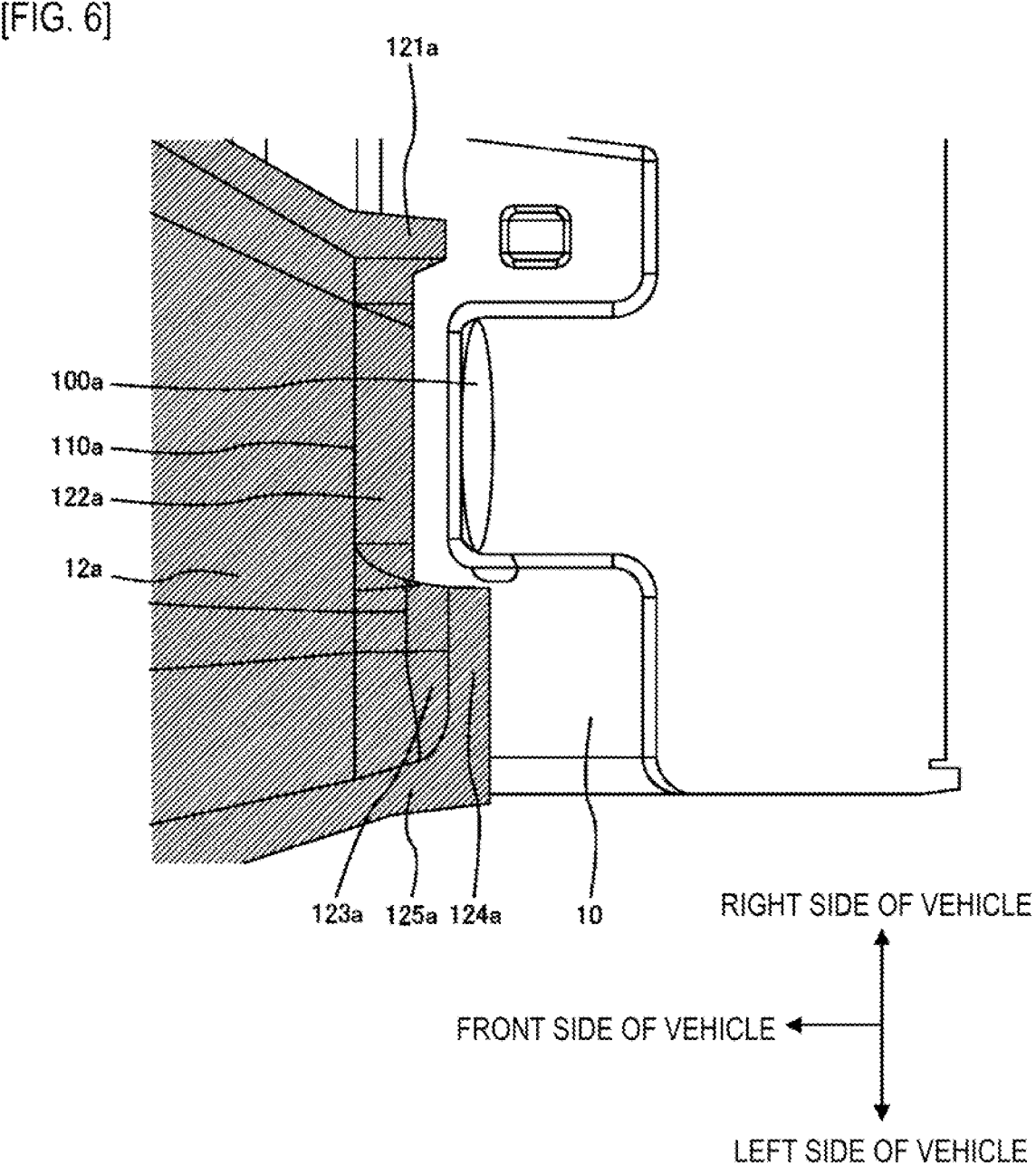

[FIG. 7]
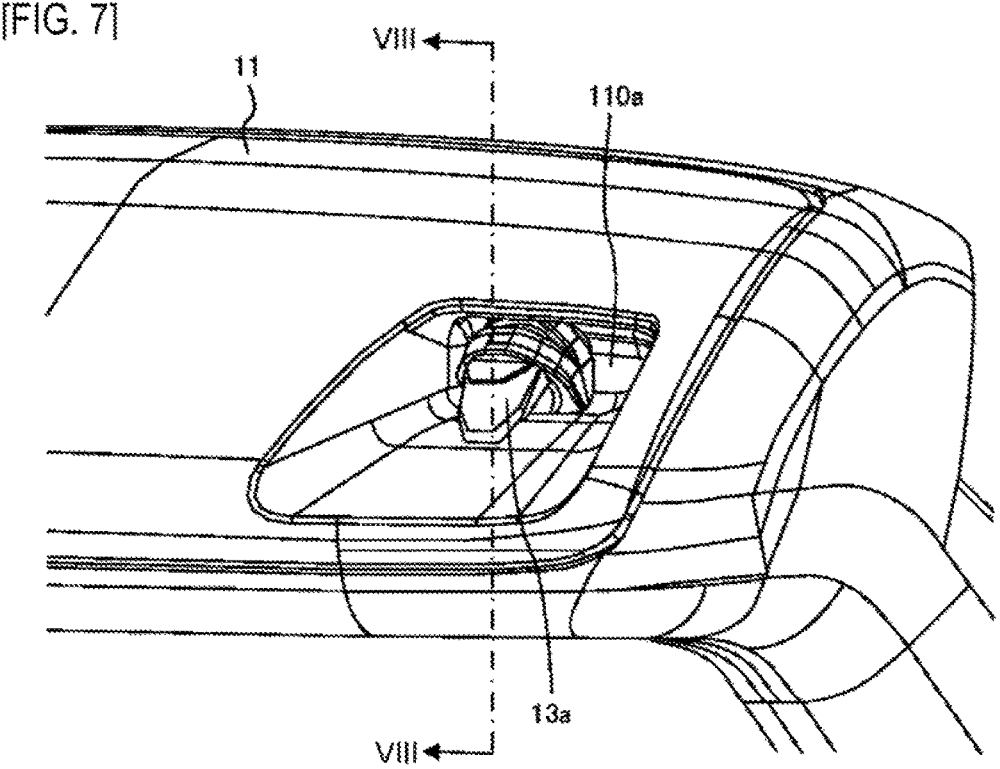
[FIG. 8A]
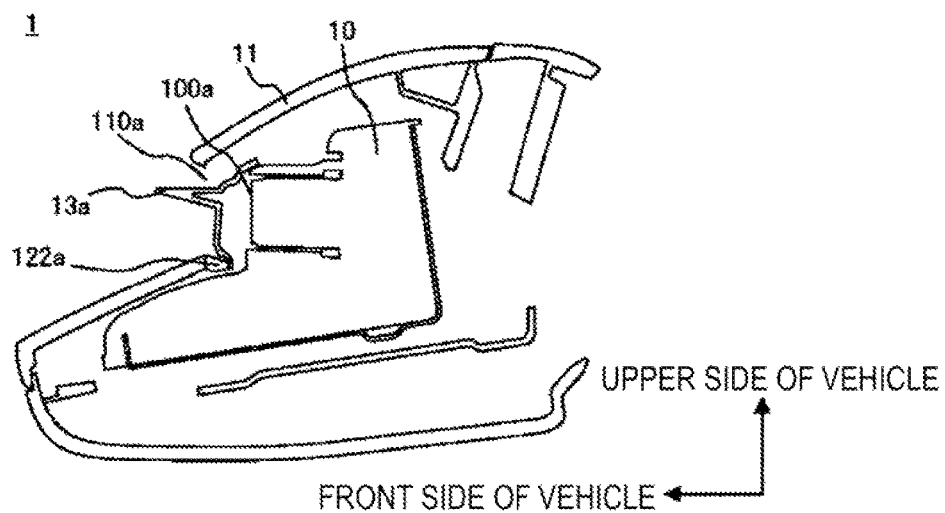

[FIG. 8B]
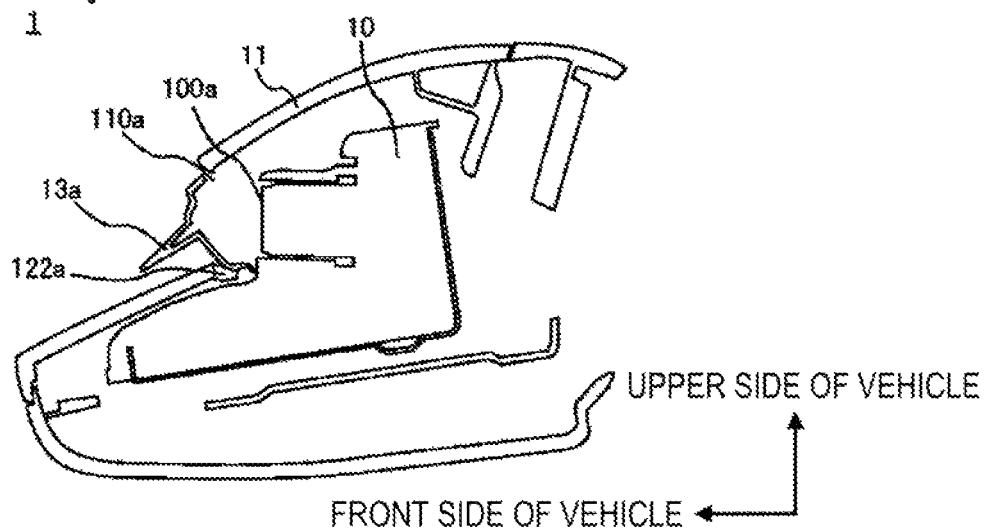
[FIG. 8C]
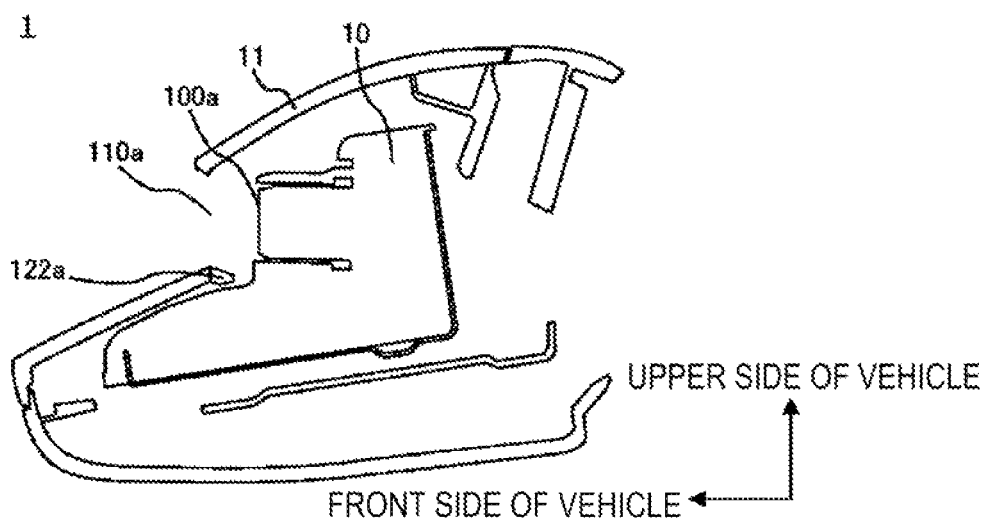

IMAGE CAPTURE APPARATUS

CROSS-REFERENCE TO RELATED APPLICATIONS

This application is a U.S. National Stage entry of PCT Application No: PCT/JP2019/023840 filed Jun. 17, 2019, which claims priority to Japanese Patent Application No. 2018-116164 filed Jun. 19, 2018, the contents of which are incorporated herein by reference.

TECHNICAL FIELD

The present disclosure relates to an image capture apparatus for a vehicle.

BACKGROUND ART

A related-art vehicle includes a camera that captures an image of a front of the vehicle. Patent Literature 1 discloses a stereo camera mounting structure installed in a vehicle interior of a vehicle. The stereo camera mounting structure includes a stereo camera and a cover that covers the stereo camera.

CITATION LIST

Patent Literature

Patent Literature 1: JP-A-2017-81261

SUMMARY OF INVENTION

Technical Problem

A gap may be formed between the camera and an opening that is located in front of a lens of the camera and is formed in the cover accommodating the camera. In this case, an inside of the cover can be seen through this gap, which causes a problem that an appearance is deteriorated.

Therefore, the present disclosure has been made in view of these points, and an object thereof is to provide an image capture apparatus capable of improving an appearance of a vehicle.

Solution to Problem

A first illustrative aspect of the present disclosure provides an image capture apparatus comprising: an image capture unit provided at a front of a vehicle and configured to capture an image in front of the vehicle; a cover accommodating the image capture unit and having an opening located in front of a lens of the image capture unit; and a shield portion extending from an edge of the opening toward an inside of the cover, the shield portion shielding at least a part of a region between the edge of the opening and the image capture unit.

The shield portion may include: a side rib extending rearward in a front-rear direction of the vehicle from a side edge, in a vehicle width direction, of the opening at an inner surface of the cover; and a lower rib extending rearward in the front-rear direction of the vehicle from a lower edge, in a height direction of the vehicle, of the opening at the inner surface of the cover.

The cover may include: a first opening portion opened to a rear of the vehicle and located in front of the lens; and a second opening portion opened to the front of the vehicle, and the shield portion may include: a side rib protruding rearward from a side edge of the first opening portion of the cover; and a lower rib protruding rearward from a lower edge of the first opening portion of the cover.

The image capture unit may include a plurality of lenses adjacent to each other in a vehicle width direction, the cover may have a plurality of openings located in front of the plurality of lenses, respectively, and the shield portion may include: an inner side rib extending rearward in a front-rear direction of the vehicle from an inner edge, in the vehicle width direction, of the opening at an inner surface of the cover; a lower rib extending rearward in the front-rear direction of the vehicle from a lower edge, in a height direction of the vehicle, of the opening at the inner surface of the cover; an outer lower rib extending in the front-rear direction of the vehicle at a position behind and outside an outer edge, in the vehicle width direction, of the opening at the inner surface of the cover; and a rear rib extending upward in the height direction of the vehicle from a rear end of the outer lower rib.

The lower rib may be inclined such that a distance to a horizontal plane passing through a front end of the lower rib increases toward a rear in the front-rear direction of the vehicle.

Advantageous Effects of Invention

According to the present disclosure, it is possible to improve the appearance of the vehicle mounted with the image capture apparatus.

BRIEF DESCRIPTION OF DRAWINGS

FIG. 1 is a diagram illustrating a state in which an image capture apparatus according to the present embodiment is provided in a vehicle.

FIG. 2 is a diagram illustrating a configuration of the image capture apparatus according to the present embodiment.

FIG. 3 is a diagram illustrating a state in which a vicinity of a lens of the image capture apparatus is viewed from a left-oblique front side.

FIG. 4 is a diagram illustrating a state in which the vicinity of the lens of the image capture apparatus is viewed from a right-oblique front side.

FIG. 5 is an enlarged view of a vicinity of a shield portion of a cover.

FIG. 6 is a cross sectional view taken along a line VI-VI of FIG. 3.

FIG. 7 is a diagram illustrating a state in which a lid portion is attached to an opening.

FIG. 8A is a cross-sectional view taken along a line VIII-VIII of FIG. 7, and is a cross-sectional view of a state in which the lid portion is attached to the opening.

FIG. 8B is a cross-sectional view taken along the line VIII-VIII of FIG. 7, and is a cross-sectional view of a state in which the lid portion is being removed from the opening.

FIG. 8C is a cross-sectional view taken along the line VIII-VIII of FIG. 7, and is a cross-sectional view of a state in which the lid portion is removed from the opening.

DESCRIPTION OF EMBODIMENTS

Present Embodiment

State in Which Image Capture Apparatus 1 is Provided in Vehicle

FIG. 1 is a diagram illustrating a state in which an image capture apparatus 1 according to the present embodiment is provided in a vehicle.

The vehicle includes the image capture apparatus 1. As illustrated in FIG. 1, the image capture apparatus 1 is provided at the front of the vehicle. The image capture apparatus 1 is, for example, a stereo camera, a monocular camera, or a video camera. The vehicle controls automatic braking based on, for example, an image of an object in front of the vehicle captured by the image capture apparatus 1 and distance information to the object.

Summary of Image Capture Apparatus 1

FIG. 2 is a diagram illustrating a configuration of the image capture apparatus 1 according to the present embodiment. FIG. 3 is a diagram illustrating a state in which a vicinity of a lens 100a of the image capture apparatus 1 is viewed from a left-oblique front side. FIG. 4 is a diagram illustrating a state in which the vicinity of the lens 100a of the image capture apparatus 1 is viewed from a right-oblique front side. FIG. 5 is an enlarged view of a vicinity of a shield portion 12a of a cover 11. FIG. 6 is a cross sectional view taken along a line VI-VI of FIG. 3.

The image capture apparatus 1 includes an image capture unit 10, the cover 11, a shield portion 12, and a lid portion 13. The image capture unit 10 is provided at the front of the vehicle and captures an image in front of the vehicle. The image capture unit 10 includes a plurality of lenses adjacent to each other in a vehicle width direction. Specifically, the image capture unit 10 includes the lens 100a and a lens 100b as a lens 100.

The lens 100a is provided on a left side of the image capture unit 10 in the vehicle width direction. The lens 100b is provided on a right side of the image capture unit 10 in the vehicle width direction.

The cover 11 accommodates the image capture unit 10 and includes an opening 110. The opening 110 is located in front of the lens 100 of the image capture unit 10. The cover 11 includes a plurality of openings located in front of the plurality of lenses, respectively. Specifically, the cover 11 includes an opening 110a and an opening 110b as the opening 110. The opening 110a is provided on a left side of the cover 11 in the vehicle width direction. The opening 110a is located in front of the lens 100a of the image capture unit 10. The opening 110b is provided on a right side of the cover 11 in the vehicle width direction. The opening 110b is located in front of the lens 100b of the image capture unit 10. It can also be said that the cover 11 includes a first opening portion (opening 110) that opens to a rear of the vehicle and is located in front of the lens 100 and a second opening portion that opens to a front of the vehicle.

The shield portion 12 extends from an edge of the opening 110 toward an inside of the cover 11, and shields a region that is at least a part of a region between the edge of the opening 110 and the image capture unit 10. As the shield portion 12, the shield portion 12a and a shield portion 12b are provided. As illustrated in FIG. 5 and the like, the shield portion 12a is provided on the left side of the cover 11 in the vehicle width direction. The shield portion 12b is provided on the right side of the cover 11 in the vehicle width direction. Since the shield portion 12b is formed to be left-right symmetrical to the shield portion 12a illustrated in FIG. 5 and the like, illustration thereof is omitted. Details of the shield portion 12 will be described below.

FIG. 7 is a diagram illustrating a state in which a lid portion 13a is attached to the opening 110a.

The lid portion 13 is a lens protection cap for protecting the lens 100 of the image capture unit 10. The lid portion 13a and a lid portion 13b are provided as the lid portion 13. The lid portion 13a is a lens protection cap for protecting the lens 100a provided on the left side of the image capture unit 10 in the vehicle width direction. The lid portion 13b is a lens protection cap for protecting the lens 100b provided on the right side of the image capture unit 10 in the vehicle width direction. Since the lid portion 13b is formed to be left-right symmetrical to the lid portion 13a illustrated in FIG. 7 and the like, illustration thereof is omitted.

As illustrated in FIG. 7, the lid portion 13 is attached to the front of the lens 100 in the opening 110. The lid portion 13 is attached for the purpose of protecting the lens 100 during assembling of the image capture apparatus 1, and is removed after the cover 11 is attached. Details of the lid portion 13 will be described below.

[Details of Shield Portion 12]

As illustrated FIGS. 5 and 6, the shield portion 12 includes a side rib 120 and a lower rib 122. The side rib 120 extends (protrudes) rearward in a front-rear direction of the vehicle from a side edge, in the vehicle width direction, of the opening 110 (also referred to as "first opening") in an inner surface of the cover 11.

A side rib 120a and a side rib 120b are provided as the side rib 120. The side rib 120a is a side rib of the shield portion 12a provided on the left side of the cover 11 in the vehicle width direction. The side rib 120a extends rearward in the front-rear direction of the vehicle from a side edge, in the vehicle width direction, of the opening 110a in the inner surface of the cover 11.

The side rib 120b is a side rib of the shield portion 12b provided on the right side of the cover 11 in the vehicle width direction. The side rib 120b extends rearward in the front-rear direction of the vehicle from a side edge, in the vehicle width direction, of the opening 110b in the inner surface of the cover 11.

Specifically, the shield portion 12 includes an inner side rib 121. The inner side rib 121 extends rearward in the front-rear direction of the vehicle from an inner edge, in the vehicle width direction, of the opening 110 in the inner surface of the cover 11.

An inner side rib 121a and an inner side rib 121b are provided as the inner side rib 121. The inner side rib 121a is an inner side rib of the shield portion 12a provided on the left side of the cover 11 in the vehicle width direction. The inner side rib 121a extends rearward in the front-rear direction of the vehicle from an inner edge, in the vehicle width direction, of the opening 110a in the inner surface of the cover 11.

The inner side rib 121b is an inner side rib of the shield portion 12b provided on the right side of the cover 11 in the vehicle width direction. The inner side rib 121b extends rearward in the front-rear direction of the vehicle from an inner edge, in the vehicle width direction, of the opening 110b in the inner surface of the cover 11.

The lower rib 122 extends (protrudes) rearward in the front-rear direction of the vehicle from a lower edge, in a height direction of the vehicle, of the opening 110 in the inner surface of the cover 11.

A lower rib 122a and a lower rib 122b are provided as the lower rib 122. The lower rib 122a is a lower rib of the shield portion 12a provided on the left side of the vehicle of the cover 11 in the vehicle width direction. The lower rib 122a extends rearward in the front-rear direction of the vehicle from a lower edge, in the height direction of the vehicle, of the opening 110a in the inner surface of the cover 11.

The lower rib 122b is a lower rib of the shield portion 12b provided on the right side of the cover 11 in the vehicle width direction. The lower rib 122b extends rearward in the front-rear direction of the vehicle from a lower edge, in the height direction of the vehicle, of the opening 110*b* in the inner surface of the cover 11. The side rib 120*b*, the inner side rib 121*b*, the lower rib 122*b*, an outer lower rib 123*b*, a rear rib 124*b*, an outer side rib 125*b*, and an upper rib 126*b* are formed to be left-right symmetrical to the side rib 120*a*, the inner side rib 121*a*, the lower rib 122*a*, an outer lower rib 123*a*, a rear rib 124*a*, an outer side rib 125*a*, and an upper rib 126*a* shown in FIG. 5, etc., respectively, and thus illustration thereof is omitted.

FIGS. 8A to 8C are cross-sectional views taken along a line VIII-VIII in FIG. 7. FIG. 8A is a cross-sectional view of the state in which the lid portion 13*a* is attached to the opening 110*a*. FIG. 8B is a cross-sectional view of a state in which the lid portion 13*a* is being removed from the opening 110*a*. FIG. 8C is a cross-sectional view of a state in which the lid portion 13*a* is removed from the opening 110*a*.

As illustrated in FIGS. 8A to 8C, the lower rib 122 is inclined such that a distance to a horizontal plane passing through a front end of the lower rib 122 increases toward the rear in the front-rear direction of the vehicle. That is, the lower rib 122 is inclined such that a rear end of the lower rib 122 in the front-rear direction of the vehicle is lower than the front end of the lower rib 122.

As illustrated in FIG. 8A, in the state in which the lid portion 13 is attached to the front of the lens 100 of the image capture unit 10, a lower end of the lid portion 13 is located between the lower rib 122 of the shield portion 12 and the image capture unit 10. An upper end of the lid portion 13 is located between an upper end edge of the opening 110 of the cover 11 and the image capture unit 10. In this manner, the lid portion 13 is attached to the front of the lens 100 of the image capture unit 10.

As illustrated in FIG. 8B, for example, the upper end of the lid portion 13 is moved more forward than the opening 110 of the cover 11 from between the upper end edge of the opening 110 of the cover 11 and the image capture unit 10 by pushing a protruding portion formed on a front surface of the lid portion 13 downward. Then, as illustrated in FIG. 8C, the lid portion 13 is removed from the opening 110 of the cover 11.

As described above, the lower rib 122 is inclined such that the distance to the horizontal plane passing through the front end of the lower rib 122 increases toward the rear in the front-rear direction of the vehicle, so that when the lid portion 13 is removed from the image capture apparatus 1, it is possible to ensure a trajectory on which the upper end of the lid portion 13 moves with the lower end of the lid portion 13 as a fulcrum. As a result, the upper end of the lid portion 13 is easily moved forward with the lower end of the lid portion 13 as the fulcrum, so that the lid portion 13 can be easily removed from the image capture apparatus 1.

Further, as illustrated in FIGS. 5 and 6, the shield portion 12 includes an outer lower rib 123, a rear rib 124, an outer side rib 125, and an upper rib 126. The outer lower rib 123 extends in the front-rear direction of the vehicle at a position behind and outside an outer edge, in the vehicle width direction, of the opening 110 in the inner surface of the cover 11.

The outer lower rib 123*a* and the outer lower rib 123*b* are provided as the outer lower rib 123. The outer lower rib 123*a* is an outer lower rib of the shield portion 12*a* provided on the left side of the cover 11 in the vehicle width direction. The outer lower rib 123*a* extends in the front-rear direction of the vehicle at a position behind and outside an outer edge, in the vehicle width direction, of the opening 110*a* in the inner surface of the cover 11.

The outer lower rib 123*b* is an outer lower rib of the shield portion 12*b* provided on the right side of the cover 11 in the vehicle width direction. The outer lower rib 123*b* extends in the front-rear direction of the vehicle at a position behind and outside an outer edge, in the vehicle width direction, of the opening 110*b* in the inner surface of the cover 11.

The rear rib 124 extends upward in the height direction of the vehicle from a rear end of the outer lower rib 123. The rear rib 124*a* and the rear rib 124*b* are provided as the rear rib 124. The rear rib 124*a* is a rear rib of the shield portion 12*a* provided on the left side of the cover 11 in the vehicle width direction. The rear rib 124*a* extends upward in the height direction of the vehicle from a rear end of the outer lower rib 123*a*.

The rear rib 124*b* is a rear rib of the shield portion 12*b* provided on the right side of the cover 11 in the vehicle width direction. The rear rib 124*b* extends upward in the height direction of the vehicle from a rear end of the outer lower rib 123*b*.

The outer side rib 125 extends in the front-rear direction of the vehicle at a position behind and outside the outer edge, in the vehicle width direction, of the opening 110 in the inner surface of the cover 11.

An outer side rib 125*a* and an outer side rib 125*b* are provided as the outer side rib 125. The outer side rib 125*a* is an outer side rib of the shield portion 12*a* provided on the left side of the cover 11 in the vehicle width direction. The outer side rib 125*a* extends in the front-rear direction of the vehicle at the position behind and outside the outer edge, in the vehicle width direction, of the opening 110*a* in the inner surface of the cover 11. A lower end of the outer side rib 125*a* is connected to an outer end portion of the outer lower rib 123*a* in the vehicle width direction. A rear end of the outer side rib 125*a* is connected to an outer end portion of the rear rib 124*a* in the vehicle width direction.

The outer side rib 125*b* is an outer side rib of the shield portion 121 provided on the right side of the cover 11 in the vehicle width direction. The outer side rib 125*b* extends in the front-rear direction of the vehicle at the position behind and outside the outer edge, in the vehicle width direction, of the opening 110*b* in the inner surface of the cover 11. A lower end of the outer side rib 125*b* is connected to an outer end portion of the outer lower rib 123*b* in the vehicle width direction. A rear end of the outer side rib 125*b* is connected to an outer end portion of the rear rib 124*b* in the vehicle width direction.

The upper rib 126 extends forward in the front-rear direction of the vehicle from an upper end of the rear rib 124. The upper rib 126*a* and the upper rib 126*b* are provided as the upper rib 126. The upper rib 126*a* is an upper rib of the shield portion 12*a* provided on the left side of the cover 11 in the vehicle width direction. The upper rib 126*a* extends forward in the front-rear direction of the vehicle from an upper end of the rear rib 124*a*. An outer end portion of the upper rib 126*a* in the vehicle width direction is connected to, for example, an upper end of the outer side rib 125*a*.

The upper rib 126*b* is an upper rib of the shield portion 12*b* provided on the right side of the cover 11 in the vehicle width direction. The upper rib 126*b* extends forward in the front-rear direction of the vehicle from an upper end of the rear rib 124*b*. An outer end portion of the upper rib 126*b* in the vehicle width direction is connected to, for example, an upper end of the outer side rib 125*b*.

Modification

In the present embodiment, an example is illustrated in which the lower rib 122 is inclined such that the distance to the horizontal plane passing through the front end of the lower rib 122 increases toward the rear in the front-rear direction of the vehicle, but the present invention is not limited thereto. The lower rib 122 may be inclined such that a distance from an upper surface of the lower rib 122 to the horizontal plane passing through the front end of the lower rib 122 increases toward the rear in the front-rear direction of the vehicle.

Effects of Image Capture Apparatus 1 According to Present Embodiment

The image capture apparatus 1 according to the present embodiment includes the image capture unit 10 that is provided at the front of the vehicle and captures an image in front of the vehicle, the cover 11 that accommodates the image capture unit 10 and includes the opening 110 located in front of the lens 100 of the image capture unit 10, and the shield portion 12 that extends from the edge of the opening 110 toward the inside of the cover 11 and shields a region that is at least part of a region between the edge of the opening 110 and the image capture unit 10.

The image capture apparatus 1 according to the present embodiment includes the shield portion 12 that extends from the edge of the opening 110 toward the inside of the cover 11, and shields the region that is at least a part of the region between the edge of the opening 110 and the image capture unit 10. Therefore, in the image capture apparatus 1, the region between the edge of the opening 110 of the cover 11 and the image capture unit 10 is smaller than the region between the edge of the opening 110 of the cover 11 and the imaging unit 10 when the shield portion 12 is not provided in the cover 11. Therefore, in the image capture apparatus 1, it is less likely to see the image capture unit 10 accommodated inside the cover 11 from the region between the edge of the opening 110 of the cover 11 and the image capture unit 10. As a result, the appearance of the vehicle mounted with the image capture apparatus 1 is improved.

The present disclosure has been described using the embodiment. However, the technical scope of the present disclosure is not limited to the scope described in the above-described embodiment, and various modifications and changes can be made within the scope thereof. For example, a specific embodiment of distributing and integrating devices is not limited to the above embodiment, and all or a part thereof may be configured to be functionally or physically distributed and integrated in any unit. New embodiments generated from any combination of a plurality of embodiments are also contained in the embodiment of the present disclosure. Effects of the new embodiments generated from the combinations include effects of the original embodiments.

The present application is based on Japanese Patent Application (No. 2018-116164) filed on Jun. 19, 2018, contents of which are incorporated herein as reference.

INDUSTRIAL APPLICABILITY

The present invention has an effect of improving an appearance of a vehicle mounted with an image capture apparatus, and is useful for an image capture apparatus of a vehicle.

REFERENCE SIGNS LIST 1 image capture apparatus
10 image capture unit
100, 100a, 100b lens
11 cover
110, 110a, 110b opening
12, 12a, 12b shield portion
120, 120a, 120b side rib
121, 121a, 121b inner side rib
122, 122a, 122b lower rib
123, 123a, 123b outer lower rib
124, 124a, 124b rear rib
125, 125a, 125b outer side rib
126, 126a, 126b upper rib
13, 13a, 13b lid portion

The invention claimed is:
1. An image capture apparatus comprising:
a plurality of lenses provided at a front of a vehicle and configured to capture an image in the front of the vehicle;
a cover accommodating the plurality of lenses and having an opening located in a front of a lens of the plurality of lenses; and
a shield portion extending from an edge of the opening toward an inside of the cover, the shield portion shielding at least a part of a region between the edge of the opening and the plurality of lenses,
wherein the plurality of lenses are adjacent to each other in a vehicle width direction,
wherein the cover has a plurality of openings located in a front of the plurality of lenses, respectively, and
wherein the shield portion comprises:
an inner side rib extending rearward in a front-rear direction of the vehicle from an inner edge, in the vehicle width direction, of the opening at an inner surface of the cover;
a lower rib extending rearward in the front-rear direction of the vehicle from a lower edge, in a height direction of the vehicle, of the opening at the inner surface of the cover;
an outer lower rib extending in the front-rear direction of the vehicle at a position behind and outside an outer edge, in the vehicle width direction, of the opening at the inner surface of the cover; and
a rear rib extending upward in the height direction of the vehicle from a rear end of the outer lower rib.
2. An image capture apparatus comprising:
a plurality of lenses provided at a front of a vehicle and configured to capture an image in the front of the vehicle;
a cover accommodating the plurality of lenses and having an opening located in a front of a lens of the plurality of lenses; and
a shield portion extending from an edge of the opening toward an inside of the cover, the shield portion shielding at least a part of a region between the edge of the opening and the plurality of lenses,
wherein the shield portion comprises:
a side rib extending rearward in a front-rear direction of the vehicle from a side edge, in a vehicle width direction, of the opening at an inner surface of the cover, the side edge of the opening being located forward of the lens; and
a lower rib extending rearward in the front-rear direction of the vehicle from a lower edge, in a height direction of the vehicle, of the opening at the inner surface of the cover.
3. The image capture apparatus according to claim 1, wherein the cover comprises:

a first opening portion opened to a rear of the vehicle and located in front of the lens; and a second opening portion opened to the front of the vehicle.

4. The image capture apparatus according to claim 2, wherein the lower rib is inclined such that a distance to a horizontal plane passing through a front end of the lower rib increases toward a rear in the front-rear direction of the vehicle.

5. The image capture apparatus according to claim 3, wherein the lower rib is inclined such that a distance to a horizontal plane passing through a front end of the lower rib increases toward a rear in the front-rear direction of the vehicle.

6. The image capture apparatus according to claim 2, wherein the side rib extends rearward to cover sides of the opening.

\* \* \* \* \*